United States Patent

[11] 3,588,517

[72] Inventors Richard F. l
Fort Lauderdale, Fla.;
Francis J. Kaisler, Ellicott City, Md.
[21] Appl. No. 707,717
[22] Filed Feb. 23, 1968
[45] Patented June 28, 1971
[73] Assignee Westinghouse Electric Corporation
Pittsburgh, Pa.

[54] OPTICAL SCANNING SYSTEM HAVING A DETECTOR DISPOSED AT THE CENTER OF CURVATURE OF A SPHERICAL FOCAL SURFACE
10 Claims, 4 Drawing Figs.

[52] U.S. Cl.......................................................... 250/233,
350/7, 250/237, 178/7.6
[51] Int. Cl............................................................ G01d 5/36,
G01d 5/40
[50] Field of Search............................................ 250/233,
236, 232, 216, 228; 178/7.6; 350/6, 7

[56] References Cited
UNITED STATES PATENTS
1,785,262 12/1930 Jenkins........................... 250/236X
3,277,772 10/1966 Atwood......................... 350/7

*Primary Examiner*—John Kominski
*Assistant Examiner*—V. Lafranchi
*Attorneys*—F. H. Henson, C. F. Renz and R. L. Gable ABSTRACT: This invention relates to an optical scanner system including a lens system for focusing a radiation image onto a spherical focal surface, a radiation detector disposed at the center of curvature of the spherical focal surface, a first rotatable drumlike member disposed between the detector and the focal surface and including a plurality of lenses for collimating a portion of the radiation directed on the focal surface onto the radiation detector, a second rotatable member including a plurality of slits for selectively allowing the radiation derived from one of the plurality of lenses of the first rotatable member to be directed onto the radiation detector, and a motor associated with the first and second rotatable members for driving the first and second members at slightly different speeds in order that the slits of the second member may be successively aligned with different lenses of the first rotatable member.

3,588,517

OPTICAL SCANNING SYSTEM HAVING A DETECTOR DISPOSED AT THE CENTER OF CURVATURE OF A SPHERICAL FOCAL SURFACE

BACKGROUND OF THE INVENTION

1. Field of the Invention

This invention relates to optical scanner systems and more particularly to a system adapted to scan infrared radiation onto a single, point detector.

2. Description of the Prior Art

There is a need in the prior art for a high resolution, wide angle coverage, rapid scan system for detecting infrared radiation. The television camera devices now available have responses in the infrared spectrum which are limited in sensitivity to such a degree which inhibits their usefulness. In the alternative, optical scanners have been used for collecting and scanning on a line by line basis a radiation image derived from a field of view onto a detector(s) to sense an incremental portion of the total radiation image. Illustratively, these scanners have included a plurality of reflective surfaces which are rotated to scan the radiation image over a focal surface. Typically, a radiation detector is disposed behind an apertured disc which allows a portion of the radiation image to be directed onto the detector. In another embodiment of the prior art, a plurality of lenses may be mounted and rotated so as to focus the radiation image onto a suitable detector(s). The difficulties of the prior art scanner devices reside in the limits imposed upon the rates of scanning due to the mechanical inertia of the plurality of focusing lenses or mirrors. Further, special mirrors and lenses may be required in order to focus an entire field onto a focal surface without introducing distortions in the radiation image. In the embodiments of the prior art including a plurality of radiation detectors, it may be necessary to store the signals derived from the detectors in order that the signals may be properly commutated and read out in the required line by line mode. As a result, such systems may require expensive storage and commutating circuits.

It is therefore a primary object of this invention to provide a high resolution, wide angle coverage radiation scanning system capable of rapidly scanning a radiation image.

It is a further object of this invention to provide a new and novel radiation scanning system that mechanically achieves a rapid scan and high resolution without the use of expensive storage and commutating circuits.

SUMMARY OF THE INVENTION

These and other objects are accomplished in accordance with the teachings of the present invention by providing a new and improved radiation scanning system including a lens assembly for focusing a radiation image onto a spherical focal surface, a radiation detector disposed at the center of curvature of the spherical focal surface, a first rotatable member having a plurality of lenses for focusing portions of the radiation image directed onto the focal surface onto the center of curvature, a second rotatable member having a plurality of slits disposed to selectively allow radiation of the focal surface and passing through one of the lenses to be directed onto the radiation detector, and suitable drive means for rotating the first and second rotatable members with respect to each other so that the slits of the second member are incrementally advanced with respect to the lenses of the first rotatable member. The lenses for collimating the radiation are disposed within apertures of the first rotating member which determine the resolution of the scanning system. The apertures and lenses are disposed about the periphery of the first rotating member in sets corresponding approximately to the length of a single line scan. The apertures and lenses are offset from the apertures of a previous set by an amount corresponding to the line width of the radiation scanning system. The number of apertures and lenses in a single group corresponds to the number of revolutions required of the first rotating member to scan the entire radiation image.

DESCRIPTION OF THE DRAWINGS

These and other objects and advantages of the present invention will become more apparent when considered in view of the following detailed description and drawings, in which.

DESCRIPTION OF THE PREFERRED EMBODIMENT

Figure 1:
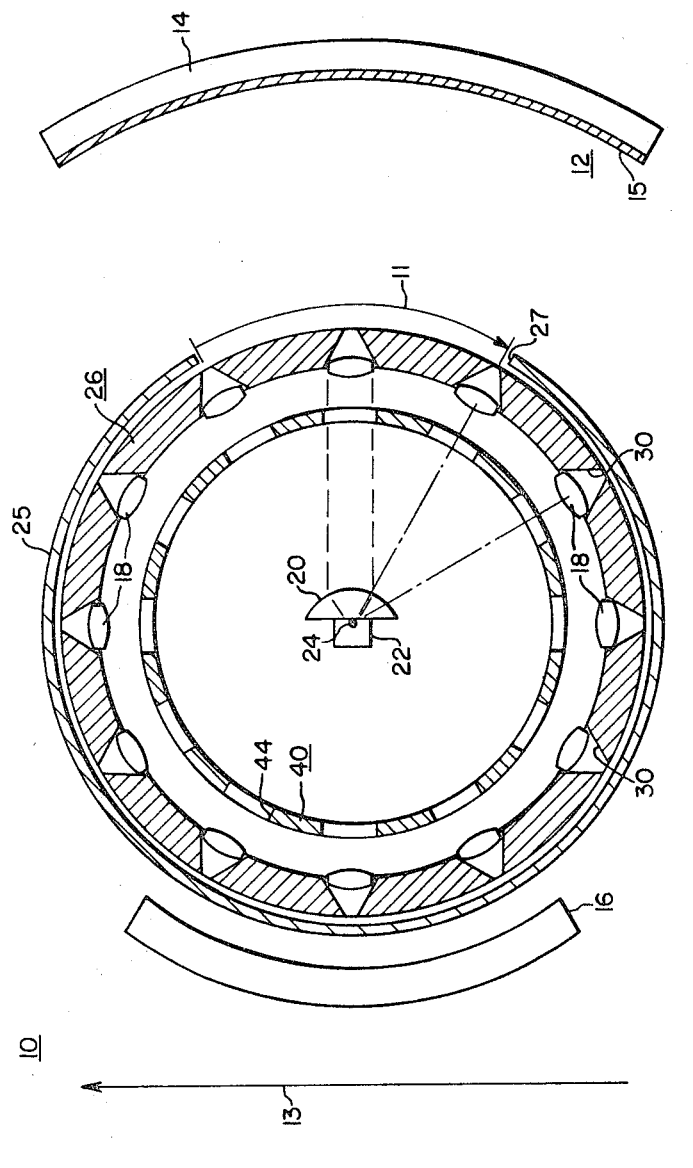
FIG. 1 is a plan, sectioned view of a radiation scanning system in accordance with the teachings of this invention.

Referring now to the drawings and in particular to FIG. 1, there is shown an illustrative embodiment of a radiation scanning system 10 which includes a lens system 12 for collecting and focusing a radiation image derived from a field 13 onto a spherical focal surface 11. Illustratively, the radiation image may be focused with the desired high resolution onto the spherical focal surface 11 by a Bouwers-Maksutov lens system 12 as shown in FIG. 1. The lens system 12 includes a spherical primary mirror 14 and a meniscus lens 16 comprising an irdome (infrared dome). The primary lens 14 has a spherical reflecting surface 15 which is disposed concentrically about a center of curvature 24 for the lens system 12. In addition, the meniscus lens 16 is of a spherical configuration which is disposed concentrically about the center of curvature 24. The lens system 12 as described above will have a large field of view of uniform resolution, since there is no uniquely defined optical axis. The focal surface 11 is also concentric about the center of curvature 24.

Figure 2:
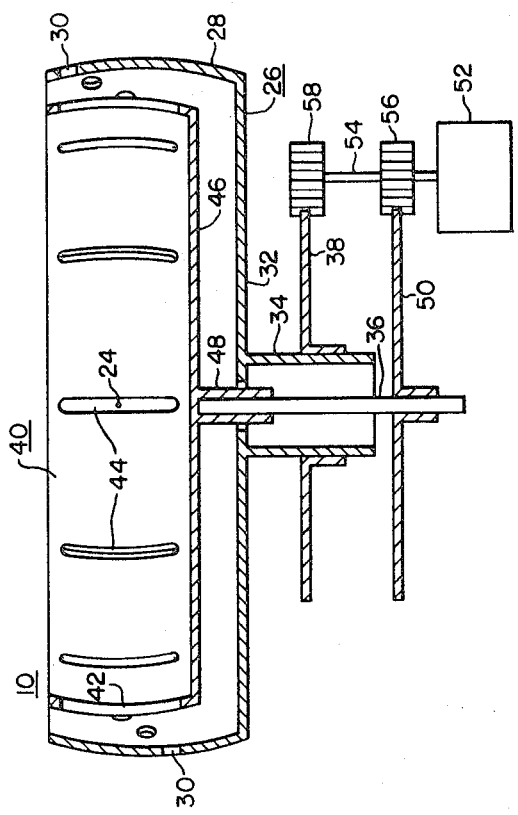
FIG. 2 is a sectional side view of the scanning system of FIG. 1.

The radiation scanning system 10 includes a first rotating, drumlike member 26. As shown in FIGS. 1 and 2, the rotating member 26 is rotatably mounted about an axis passing through the center of curvature 24. The first member 26 includes a wall portion 28, which as shown in FIG. 2 is of a spherical configuration. The spherically shaped wall portion 28 is so mounted so as to be concentric about the center of curvature 24. As shown more clearly in FIG. 1, a plurality of collimating lenses 18 are disposed within conically shaped apertures 30 through the wall portion 28. The axes of the lenses 18 pass through the center of curvature 24. The lenses 18 serve to collimate that portion of the radiation focused in the focal surface 11 and passing through the apertures 30 onto a fixed collecting lens 20. Thus as the member 26 is rotated, one of the lenses 18 is swept across the focal surface 11 and serves to collimate a linear portion or line of radiation which is directed onto the collecting lens 20. A field stop 25 is disposed about the first rotating member 26 to shield the radiation detector 22 from extraneous radiation. The field stop 25 has an opening 27 therein to allow the radiation focused upon the focal field 11 to be scanned by the lenses 18. As shown in FIG. 1, the collecting lens 20 collects and focuses the radiation onto the center of curvature 24. A suitable radiation detector 22 is disposed to sense the radiation focused upon the center of curvature 24. In order to efficiently sense infrared radiation, the detector 22 could take the form of a mercury doped germanium photodetector.

Referring now to FIG. 2, the first rotatable member 26 also includes a base portion 32 having a collar 34 extending from the bottom thereof along the axis of the member 26. In order to impart a rotational motion to the member 26, a motor 52 is connected through a drive shaft 54 to a drive gear 58, which meshes with a gear 38 mounted upon the collar 34. The collar 34 and thus the first rotatable member 26 is connected to the motor 52 by the drive shaft 54 and the gears 38 and 58.

The radiation scanning system 10 also includes a second rotatable member 40. The second rotatable member 40 has a wall portion 42 of a spherical configuration in which a plurality of slits 44 are disposed. The member 40 is disposed so that the spherical wall portion 42 is concentric about the center of curvature 24, and so that its axis of rotation passes through the center of curvature 24. The second rotatable member 40 includes a base member 46 from which extends a collar 48. A rotating shaft 36 is disposed within and is rotatably secured to the collar 48. In order to impart a rotational motion to the shaft 36 and the second rotatable member 40, a gear 50 is secured to the shaft 36 and engages a drive gear 56 which is connected through the drive shaft 54 to the motor 52.

Figure 3:
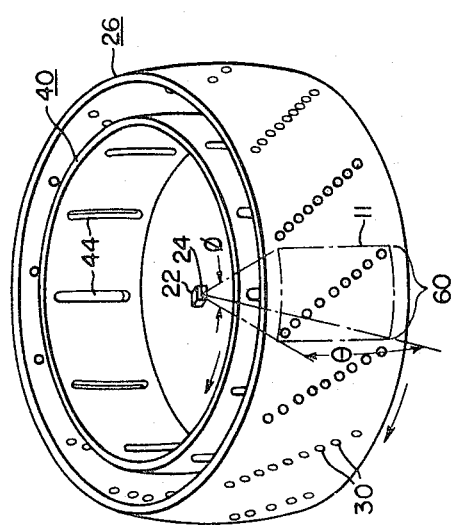
FIG. 3 is an orthogonal view of the scanning system of FIGS. 1 and 2.

As seen in FIG. 3, the focal surface 11 is scanned sequentially by the apertures 30 which match the resolution element size of the optical system. Each aperture 30 has one of the secondary lenses 18 associated with it for focusing and collimating a portion of the radiation image directed onto the focal surface 11 toward the center of curvature 24 of the complete system. It is an important object of this invention to scan the focal surface 11 on a line by line basis starting at the top and proceeding to the bottom to provide an output electrical signal from the detector 22 which may be in turn applied to a normal cathode-ray tube to provide a visual image. Significantly, the single, infrared detector 22 converts the radiation into a corresponding electrical output signal.

Figure 4:
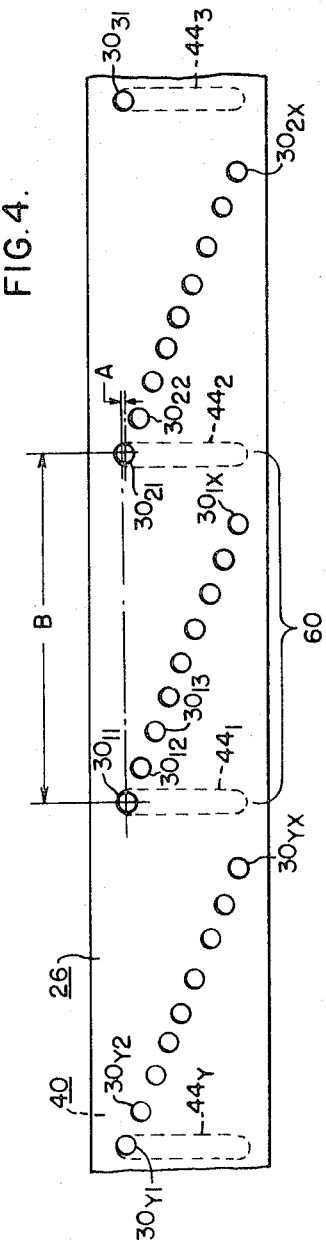
FIG. 4 is a flattened development of a portion of the first and second drum members shown in FIGS. 1, 2 and 3.

As seen in FIGS. 3 and 4, the apertures 30 are disposed in groups 60 about the periphery of the first rotating member 26. Referring now to FIG. 4, the focal surface 11 is first scanned by the apertures $30_{11}$ to provide the first sweep. It may be understood as explained above that the first drum 26 is being rotated in a clockwise manner as shown in FIG. 3. After the aperture $30_{11}$ has completed its first sweep, aperture $30_{21}$ is selected to be the next active aperture to sweep across the focal surface 11. As shown in FIG. 4, aperture $30_{21}$ is spaced a distance A below aperture $30_{11}$. Distance A is equal to the desired line width and is illustratively set equal to the diameter of the aperture 30, i.e., the resolution element size of the optical system 10. The aperture $30_{21}$ is spaced a distance B from aperture $30_{11}$. The horizontal spacing, i.e., distance B, is approximately equal to the azimuth $\Phi$ of the focal surface of field 11 as shown in FIG. 3. It may be understood that the azimuth $\Phi$ of the focal field 11 is slightly less by a factor $\Delta\Phi$ than the distance B in order to allow for an approximately 5 percent overscan per line for detector thermal referencing and display flyback time. In a conventional television mode of display upon a cathode-ray tube, it is necessary to provide a short interval of time between horizontal scans of the beam of electrons to allow the electron beam to fly back to begin the next line of the sweep. Next, the aperture $30_{31}$ will be rotated past the focal surface 11 to thereby provide the third sweep. In this manner, the apertures will be swept across the focal surface 11 until aperture $30_{Y1}$ is scanned. The next active aperture will be aperture $30_{12}$ which will then scan the focal surface 11.

In accordance with the teachings of this invention only one aperture 30 is active at one time. An aperture 30 is said to be active in the sense that it is being swept across the focal surface 11 and allows a portion of the radiation directed on the surface 11 to be sensed by the detector 22. The apertures 30 are spaced as shown in FIG. 4 the distance A from the previously scanned aperture. Thus the second aperture in the first group, i.e., aperture $30_{12}$, is a distance A below aperture $30_{Y1}$. The number Y of groups 60 of apertures 30 and thus the number of aperture scans per revolution is determined by the following formula:

$$Y = 360°/\Phi \quad (1)$$

where $\Phi$ is the azimuth of the focal field 11 in degrees. Thus, it is seen that the arc subtended by a group 60 of apertures 30 is substantially equal to the azimuth field coverage, which in turn determines the number of groups 60 and the number of aperture scans per revolution of the first rotating member 26.

The elevation field of the focal surface 11 is shown in FIG. 3 and is designated by the character $\Theta$. The elevation field $\Theta$ and the resolution or diameter $\alpha$ of one of the apertures 30 determines the number of lines N that are to be scanned by the system 10, which number N is given by the following formula:

$$N = \Theta/\alpha \quad (2)$$

Since the number of lines required to scan the focal surface 11 is much greater than the number Y of aperture scans per revolution, it is necessary to rotate the first member 26, X times in order to attain a complete scan of the surface 11, i.e., the number of apertures 30 in a group 60.

A plurality of detectors 22 could have been used in order to individually sense the plurality of apertures 30 during succeeding revolutions of the member 26. For example, a first detector would be associated with the apertures $30_{11}, 30_{21}—30_{Y1}$ and a second detector would be associated with the apertures $30_{12}, 30_{22}—30_{Y2}$. However, this would have necessitated at least X number of detectors and would have required a commutating system for successively reading out the signals derived by the plurality of detectors. In accordance with the teachings of this invention, the use of a storage and/or commutating circuit is no longer necessary and a single detector 22 may be used in conjunction with the second rotating member 40 to provide means whereby only one aperture 30 is active upon the focal surface 11 at any one instant of time. The second drum 40 has described above includes a Y number of the slits 44 which are disposed in a vertical direction as shown in FIG. 3 and are equally spaced an angular distance apart equal to the azimuth $\Phi$. Thus, only one slit 44 is aligned with an aperture 30 of one group 60, and in accordance with the teachings of this invention, the slit 44 selects or activates that aperture 30 with which it is aligned to scan the surface 11 and to allow a portion of the radiation directed onto the surface 11 to be sensed by the detector 22. The portion of radiation to be sensed depends upon which aperture 30 is aligned with the slit 44. For example in FIG. 4, the slit $44_1$ is aligned with the aperture $30_{11}$.

The first and second members 26 and 40 are rotated with approximately the same though not equal speed. After aperture $30_{21}$ has been rotated from the surface 11, the slit $44_2$ will be aligned during the first revolution with the aperture $30_{21}$ to allow radiation directed through the aperture $30_{21}$ to be directed onto the detector 22. In a similar manner, the slits 44 will be aligned during the first revolution with the first aperture in each of the groups 60. During the second revolution of the members 26 and 40, the slit 44 will be aligned with the second aperture in each of the groups 60. In a similar manner the slits 44 will be aligned with the next aperture within each of the groups 60 until during the last revolution the slit 44Y will be aligned with the last aperture $30_{YX}$. It is noted that the number X of apertures 30 within a group 60 is equal to the number of revolutions required to scan the surface 11 with N number of lines.

The spacing of the apertures 30 and of the groups 60 of apertures 30 is based on the following formula:

Total degrees of Revolution $= 360X = (N_A + N_I)(\Phi + \Delta\Phi)$ (3)

Where $N_A$ equals the number of active lines per field and $N_I$ equals the number of inactive lines per field. It may be understood that in the normal television mode of scanning, it is necessary to provide a slight delay between the scanning of one field and the next field due to the need for returning the beam of electrons to the top of the raster to commence the next field. This flyback time is in the order of 5 percent overscan per frame for vertical display flyback time. As shown in FIG. 4, the apertures 30 within the group 60 are equally spaced from each other and the apertures of a single group 60 are disposed along a portion of the first member 26 subtending an arc equal to the azimuth field coverage of $\Phi°$. The spacing of the last aperture 30 in one group 60 and the first aperture of the next group 60 is equal to $\Delta\Phi$. Precisely, the spacing between apertures within a single group 60 is equal to the azimuth field coverage $\Phi$ divided by the number of revolutions X required to complete a single field. If $\Delta\Phi$ equals 0, a limiting case occurs where the apertures 30 become grouped in sets of constant angular spacings about the periphery of the first rotating member 26, and the apertures 30 of a single group 60 would be disposed in a vertical line. In such an arrangement, the spacing between apertures 30 would be very small to retain the desired resolution and the size of the lenses 18 would be significantly reduced. Thus, the placing of the apertures 30 of a group 60 upon an angle, allows the use of larger lenses 18 and yet retains the desired high resolution. As indicated above, $\Delta\Phi$ may not normally be equal to zero, and therefore the apertures 30 are grouped in sets which are spaced from each other by a factor $\Delta\Phi$ as shown in FIG. 4. The angular separation of apertures 30 now provides a means whereby the slits 44 of the second rotating member 40 permits only one aperture to scan the focal surface 11 at any one time.

As explained above, the slits 44 are spaced from each other an angular distance of $\Phi°$ corresponding to the azimuth field coverage. With the spacing of the apertures 30 and the slits 44 as described above, it is necessary to rotate the first and second rotating members 26 and 40 at slightly different rotational velocities so that the slits 44 may be aligned with different apertures 30 during successive revolutions of the members 26 and 40. More specifically it is required that the slits 44 be delayed during 1 revolution with respect to the rotation of the apertures 30, by an amount equal to the spacing between the apertures 30 of a group 60. For example at the end of the first revolution, the slits $44_1$ should now be aligned with the aperture $30_{12}$ and after the second revolution should be aligned with the aperture $30_{13}$. In other words, during X revolutions of the first rotating member 26, the second rotating member 40 should be rotated through a distance less than X revolutions by an amount corresponding to the azimuth field coverage $\Phi$. During a single revolution of the first rotating member 26, the second rotating member 40 will be rotated through a single revolution less an amount corresponding to the spacing between the apertures 30 of a group 60. Because of the differing angular velocities, the horizontal width of the slits 44 of the member 40 should be greater than the diameter of the apertures 30 of the member 26 in order to allow for a slippage of one of the slits 44 with respect to an aperture 30. The rotation of the first rotating member 26 with respect to the second rotating member 40 is $\Phi°$ per complete frame in a direction opposite to the rotation of the first rotating member 26; the ratio of the speeds of revolution may be expressed by the following formula:

$$\frac{W_{40}}{W_{26}} = 1 - \frac{\phi}{360X} \quad (4)$$

where $W_{26}$ is the angular velocity of the first rotating member 26 and $W_{40}$ is the angular velocity of the second rotating member 40. With regard to FIG. 2, the angular velocities of the first and second rotating members 26 and 40 is achieved by varying the number of teeth placed upon the gears 38 and 58 with respect to the number of teeth placed upon the gears 50 and 56. Thus there has been described structural means for selectively activating one of the apertures 30 as it is scanned across the focal surface 11 and for advancing the slits 44 of the second rotating member 40 for each revolution to thereby scan a new set of lines corresponding to the next set of apertures.

There has been shown a radiation scanning system capable of achieving a high scan rate with drive means operated at a constant angular velocity. The power requirements for driving such a scanning system is comparatively low because there is no acceleration required of the mechanical components during the scanning operation. The scanning system as described above is inherently sensitive to radiation due to the use of a point detector device and may be operated with a data rate and format which are comparable to those of a television camera system.

Numerous changes may be made in the above-described apparatus and different embodiments of the invention may be made without departing from the spirit thereof. For example, a source of radiation could be disposed at the center 24 of curvature to thereby provide a scanning beam of light. In another embodiment of this invention the groups 60 of apertures 30 could be overlapped with each other to increase the number of scans per revolution of the rotating members. Such an embodiment would require that the slits be disposed upon an angle to be continuously aligned with one of the apertures 30. Therefore, it is intended that all matter contained in the foregoing description or shown in the accompanying drawings shall be interpreted as illustrative and not in a limiting sense.

We claim:

1. A radiation scanning system comprising a spherical surface having a center of curvature, radiation detection means disposed at the center of curvature, a first rotatable drumlike member having a plurality of lenses disposed to focus radiation upon said center of curvature, a second rotatable drumlike member within said first rotatable member and coaxially mounted therein, said second rotatable member having a plurality of openings therein disposed so that at least one of said openings is aligned between one of said lenses and said center of curvature, and drive means associated with said first and second rotatable members to drive said first and second rotatable members at differing angular velocities.

2. A radiation scanning system as claimed in claim 1, wherein said drive means rotates said second rotatable member at an angular velocity less than said first rotatable member by a predetermined amount per rotation of said first rotatable member, said amount being substantially equal to the spacing of said lenses from each other.

3. A radiation scanning system as claimed in claim 1, wherein said first rotatable member includes an aperture associated with each of said lenses defining the resolution of said system.

4. A radiation scanning system as claimed in claim 3, wherein the angular spacing between successively scanned apertures is substantially equal to the diameter of said apertures.

5. A radiation scanning system comprising a spherical surface having a center of curvature, a first rotatable member having a plurality of lenses disposed to focus radiation upon said center of curvature, a radiation detector means disposed at said center of curvatures, a second rotatable member having at least one opening therein disposed so as to be aligned between one of said lenses and said center of curvature, said second rotatable member positioned within said first rotatable member and coaxially mounted therein, said first rotatable member including an aperture associated with each of said lenses and defining the resolution of said system, said apertures disposed in groups about the periphery of said first rotatable member, the openings in said second rotatable member spaced from each other an angular distance corresponding substantially to the spacing between the first and last apertures of one of said groups and drive means associated with said first and second rotatable members to drive said first and second rotatable members at differing angular velocities.

6. A radiation scanning system comprising a spherical surface having a center of curvature, a first rotatable member having a plurality of lenses disposed to focus radiation upon said center of curvature, a radiation detector means disposed at said center of curvature, a second rotatable member having at least one opening therein disposed so as to be aligned between one of said lenses and said center of curvature, said second rotatable member positioned within said first rotatable member and coaxially mounted therein, said first rotatable member including an aperture associated with each of said lenses and defining the resolution of said system, said apertures disposed in groups about the periphery of said first rotatable member, the opening in said second rotatable member spaced from each other an angular distance corresponding substantially to the spacing between the first and last apertures of one of said groups and drive means associated with said first and second rotatable members to drive said first and second rotatable members at differing angular velocities, one of said groups of apertures is spaced from the adjacent group of apertures by a distance greater than the spacing between adjacent apertures of a single group.

7. A radiation scanning system as claimed in claim 6, wherein said drive means rotates said second rotatable member at an angular velocity less than the angular velocity of said first rotatable member by an amount corresponding to the angular spacing between adjacent apertures of one group per revolution of said first rotatable member.

8. A radiation scanning system as claimed in claim 1, wherein there is included means for focusing a radiation image onto said spherical surface.

9. A radiation scanning system is claimed in claim 1 wherein said lenses are disposed in groups about the periphery of said first rotatable member, the openings in said second rotatable member spaced from each other an angular distance corresponding substantially to the spacings between the first lens in one of said groups and the first lens in an adjacent one of said groups.

10. A radiation scanning system as claimed in claim 1 wherein said lens are disposed in groups about the periphery of said first rotatable member, the number of said openings in said second rotatable member being substantially equal to the number of groups of lenses provided in said first rotatable member.